United States Patent [19]

Stewart

[11] 3,909,037

[45] Sept. 30, 1975

[54] SAFETY DEVICE WITH COANDA EFFECT

[75] Inventor: Ben A. Stewart, Baraboo, Wis.

[73] Assignee: Olin Corporation, New Haven, Conn.

[22] Filed: May 22, 1974

[21] Appl. No.: 472,392

[52] U.S. Cl. .......... 280/150 AB; 239/418; 417/179
[51] Int. Cl.² ........................................ B60R 21/08
[58] Field of Search ............. 280/150 AB; 417/179; 239/418

[56] References Cited
UNITED STATES PATENTS

| | | | |
|---|---|---|---|
| 2,052,869 | 9/1936 | Coanda | 239/418 |
| 3,457,863 | 7/1969 | Carter | 417/179 |
| 3,624,810 | 11/1971 | Hass | 280/150 AB |
| 3,632,133 | 1/1972 | Hass | 280/150 AB |
| 3,791,669 | 2/1974 | Hamilton | 280/150 AB |
| 3,801,127 | 4/1974 | Katter et al. | 280/150 AB |
| R27,860 | 1/1974 | Day | 417/184 |

*Primary Examiner*—Leo Friaglia
*Assistant Examiner*—John P. Silverstrim
*Attorney, Agent, or Firm*—Donald R. Motsko; William W. Jones

[57] ABSTRACT

An air bag inflation system for use in vehicles for protecting the occupants thereof against injury in the event of a collision. The system utilizes ambient air for inflating the air bag with the ambient air being drawn into the air bag by one or more air movers which induce secondary fluid flow by directing the flow of a primary fluid through a Coanda nozzle.

6 Claims, 3 Drawing Figures

SAFETY DEVICE WITH COANDA EFFECT

This invention relates to a passive occupant restraining system of the "air bag" type for use in protecting vehicle passengers against injury in the event of a collision. More particularly, the system of this invention utilizes ambient air for bag inflation, which air is delivered to the bag by means of an air mover utilizing a Coanda-type nozzle.

The use of a high velocity stream of primary fluid directed through a nozzle into an atmosphere of a secondary fluid to induce fluid flow in the secondary fluid is well known. A particular type of nozzle which has proven to be highly efficient in inducing secondary fluid flow was developed by Henri Coanda, and is known as a Coanda nozzle. The form of such a Coanda nozzle is illustrated in U.S. Pat. No. 2.052,869, issued Sept. 1, 1936 to H. Coanda, particularly in FIG. 3 thereof.

One problem which has been encountered in connection with air bag passenger safety systems relates to the relatively sudden increase in pressure which results inside of a vehicle when an air bag is suddenly inflated therein in response to a collision. This problem is particularly magnified if the vehicle windows are closed when the air bag is inflated. The increase in pressure is, to say the least, discomforting to the vehicle passengers and can result in physical harm, for example, to the passengers' ears. Another undesirable result of expanding the bag into the vehicle is the noise generated by the sudden increase in pressure within the vehicle.

A solution which has been offered to the increased internal vehicle pressure problem involves the use of an aspirator which draws air from the inside of the vehicle into the air bag. This solution attempts to equalize the pressure inside of the vehicle before and after inflation of the bag by simply moving air from the vehicle interior to the inside of the bag. Air bag aspirating inflators are shown in U.S. Pat. Nos. 3,675,942, issued July 11, 1972 to J. F. Huber; 3,762,741, issued Oct. 2, 1973 to L. L. Fleck et al.; 3,767,225, issued Oct. 23, 1973 to B. Mazelsky; 3,773,350, issued Nov. 20, 1973 to J. Shibamoto; 3,773,351, issued Nov. 20, 1973 to V. O. Catanzarite; 3,776,570, issued Dec. 4, 1973 to P. O. Weman; Re27,860, issued Jan. 1, 1974 to R. H. Day; 3,784,225, issued Jan. 8, 1974 to L. L. Fleck et al.; 3,788,663, issued Jan. 29, 1974 to P. O. Weman; 3,791,669, issued Feb. 12, 1974 to B. K. Hamilton; and 3,791,666 issued Feb. 12, 1974 to J. Shibamoto.

At the present time, however, the aspirators which have been suggested for use in air bag inflation systems have been limited to ports or one-way flaps in the air bags themselves, or in severl instances, mechanical aspirators of the ejector or venturi type. Conventional aspirators of the ejector, venturi, or augmenter types generally require cumbersome hardware which is not readily suited for mounting behind interior vehicle panels. For example, if a single nozzle is used, the length requirements of the nozzle for high efficiency operation are such that it could not be readily adapted to fit behind the dashboard of a vehicle. If multiple nozzles are used then the manifold arrangement required becomes overly complicated. Additionally, conventional aspirators require high pressure, high velocity primary gas for maximum efficiency.

Another advantage attendant to the use of an atmospheric air aspirator for inflating air bags lies in the fact that a substantial amount of the bag-inflating gas is atmospheric or ambient in origin, and thus the system does not rely on bulky and expensive pressurized gas storage cylinders. The result is a more compact and less expensive system.

The inflation system of this invention utilizes an aspirator of the Coanda type for aspirating ambient air preferably from the interior of the vehicle and moving it into the air bag. The Coanda nozzle aspirator is much more efficient in utilizing primary fluid to move secondary fluid and produces a five to one overall induction ratio of secondary fluid to primary fluid, as compared to approximately a two to one overall induction ratio for conventional aspirators of the types referred to above. The Coanda aspirator also will operate at maximum efficiency with a lower primary fluid pressure in the range of about 5–45 psig thus reducing sound level as compared to conventional aspirators, and permitting the primary fluid inlet to be moved from the center of the shroud to the periphery of the shroud if desired. In this manner the Coanda aspirator gives greater design freedom as compared to conventional aspirators. The lower primary fluid pressures used by the Coanda aspirator permits the use of sheet metal construction for the device, if desired. A Coanda aspirator of the type utilized in this invention does not require a nozzle having a long throat, as does a conventional aspirator for maximum efficiency, and thus can be easily positioned behind a vehicle panel such as a dashboard, or the like.

It is therefore an object of this invention to provide an air bag safety inflation system which includes an ambient air aspirator of the Coanda type for moving ambient air into the air bag to inflate the latter.

It is a further object of this invention to provide an air bag inflation system of the character described which is compact and highly efficient in operation.

These and other objects and advantages of the inflation system of this invention will become more readily apparent from the following detailed description of a preferred embodiment thereof taken in conjunction with the accompanying drawings, in which.

Figure 1:
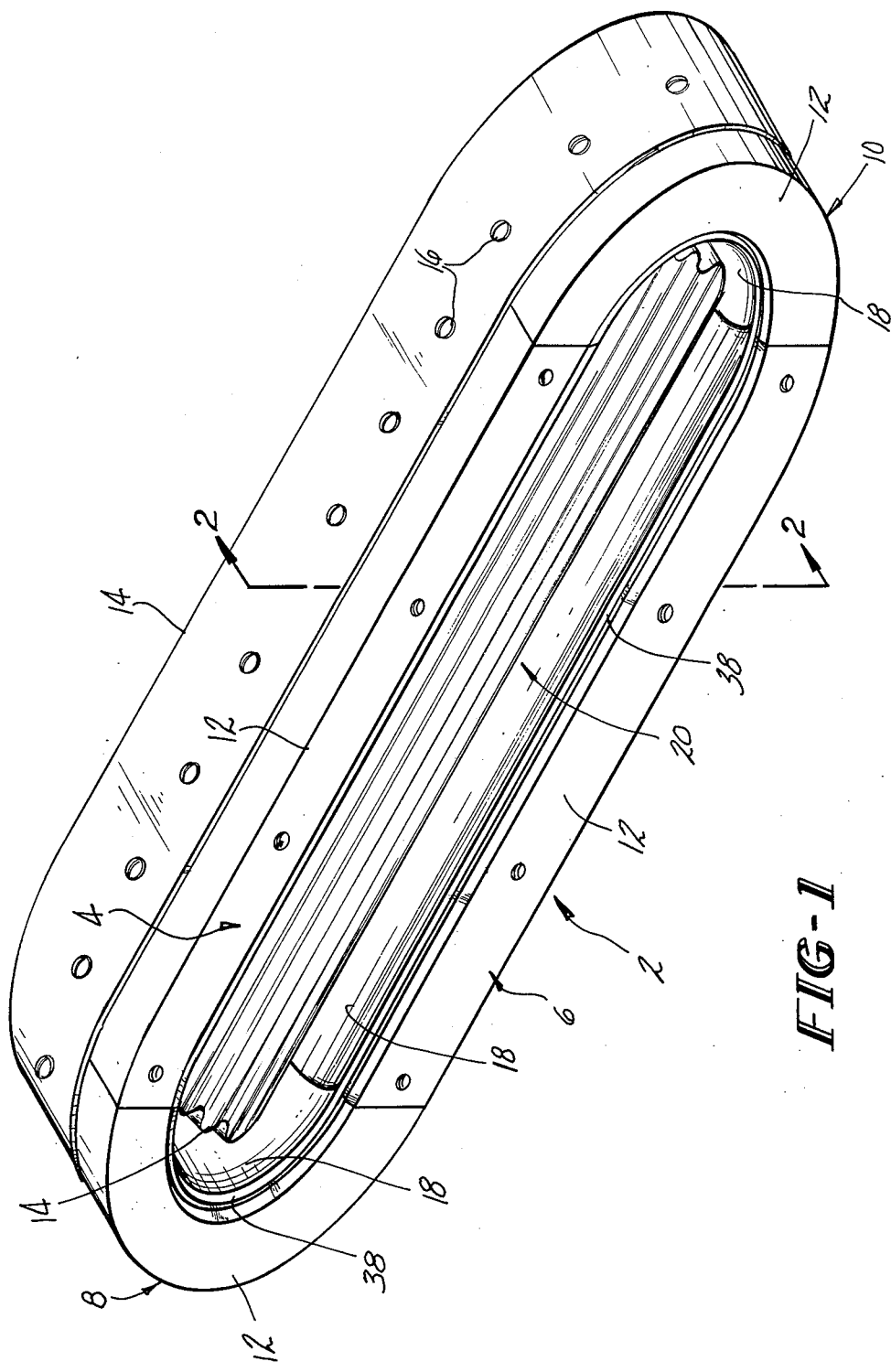
FIG. 1 is a perspective view of an embodiment of the aspirator bag inflating system of this invention.

There is shown in FIG. 1 one embodiment of an inflator formed in accordance with this invention. The inflator-aspirator 2 is shown in an annular flattened oval configuration, however, it will be recognized that the device can be made in a number of different configurations, such as round annular, linearly flat, linearly curved, and the like without departing from the spirit of the invention. The device, in its flattened oval configuration is formed in four basic sections which include upper and lower linear manifold parts 4 and 6 respectively having their adjacent ends connected by U-shaped manifold end parts 8 and 10. Each of the four basic sections includes the same general components which will be specifically described in greater detail hereinafter.

The aspirator 2 includes a shroud 12 to which is fastened the free edges of an air bag 14 by means of rivets 16 or the like. An inner air foil-forming plate member 18 is secured to the shroud 12 and forms a hollow throat 20 of relatively short longitudinal extent in the aspirator, into which throat 20 the remainder of the air bag 14 is folded and stored. It will be appreciated that with the particular configuration shown in FIG. 1, the shroud 12 and plate member 18 are actually each made up of four separate components connected together to form the flattened oval aspirator.

Figure 2:
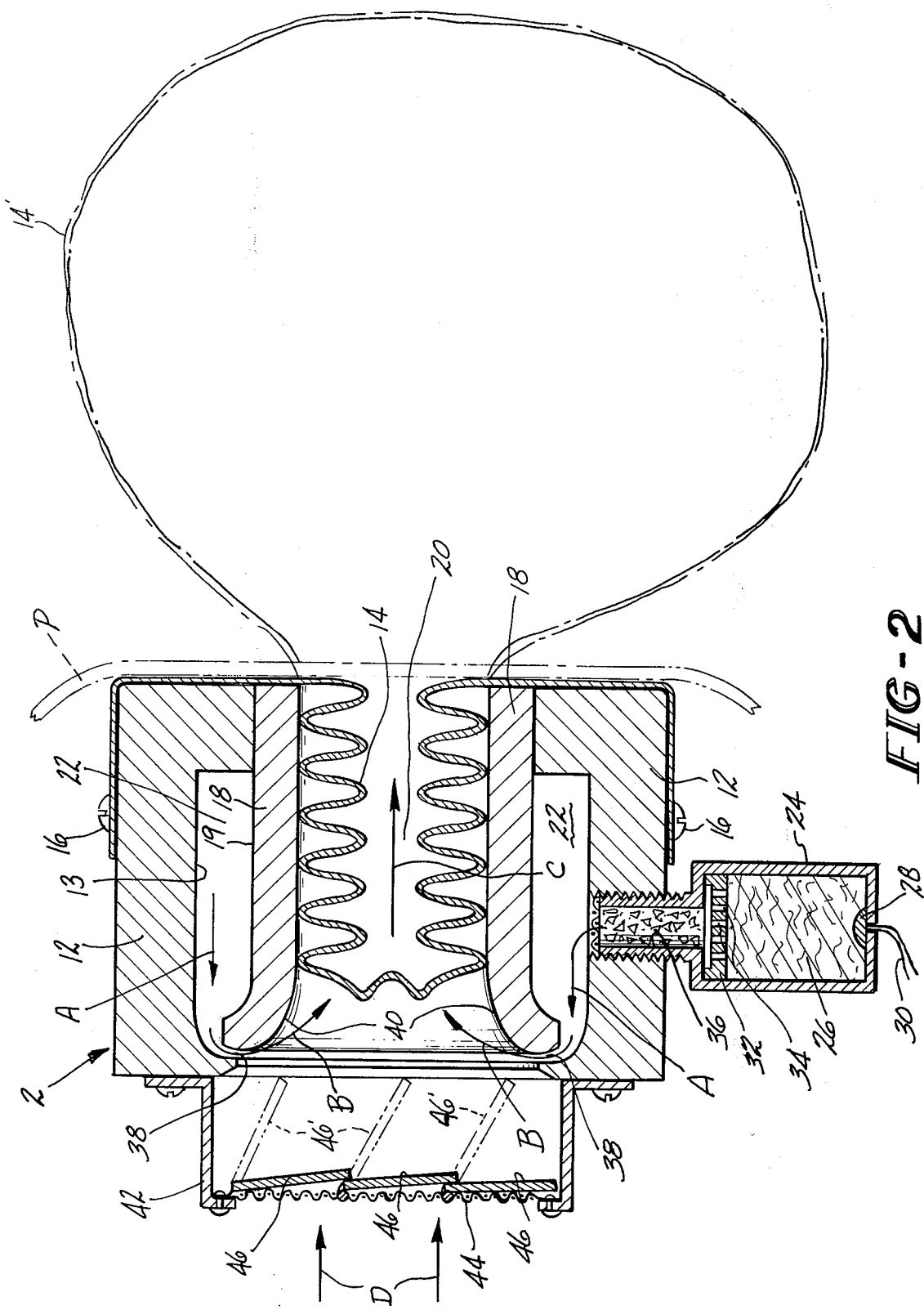
FIG. 2 is a sectioned view of the structure of FIG. 1 taken along line 2—2 thereof.

Referring now to FIG. 2, there is shown the internal arrangement of parts of the aspirator 2 of FIG. 1. The inner surface 13 of the shroud 12 is spaced apart from the outer surface 19 of the plate member 18 to form a chamber 22 into which a flow of pressurized gas, or primary gas, is introduced. The pressurized gas may be derived from any conventional source, such as a container of pressurized fluid, the burning of a gas producing material, or the like. For purposes of illustration, there is shown a combustion chamber 24 in which is packed a charge of deflagratable material 26 which, when burned, produces a flow of combustion gases. An electrically initiatable squib 28 is placed in the chamber 24 and will be ignited by electric current through conductors 30 which are connected to a source of electric current (not shown). The circuit between the squib 28 and current source will be closed by a conventional impact sensor (not shown) mounted on the vehicle. At the mouth of the combustion chamber 24 there is positioned a pressure plate 32 having through passages 34 through which combustion gases flow into a conduit 36 which communicates with the primary gas chamber 22. The conduit 36 may be filled with a coolant material 37 of any conventional composition which cools the combustion gas before entering the chamber 22. A screen 39 or other porous body overlies to coolant material so as to prevent its expulsion from the conduit 36. It will be appreciated that one or more combustion chambers or other sources of primary gas may be used with a single aspirator of the type shown in the drawings.

It will be noted that there is a gap 38 between the shroud 12 and the plate 18 and that the inner trailing surface 40 of the plate 18 is formed with an air foil-type curvature. Thus the gap 38 forms a Coanda-type slot which interconnects the chamber 22 with the throat 20 of the aspirator. The aspirator 2 will thus utilize the Coanda effect to establish a flow of ambient air through the throat 20 as will be more clearly set forth hereinafter.

In order to regulate the flow of ambient air through the throat 20, a cag 42 is mounted on the shroud 12, which cage 42 covers the inlet side (to the left as viewed in FIG. 2) of the aspirator 2. A wire screen 44 spans the cage 42 and a plurality of flaps 46 are pivotally mounted on the screen 44. As has been previously noted, the air bag 14 is folded and disposed in the throat 20 of the aspirator for compactness.

Figure 3:
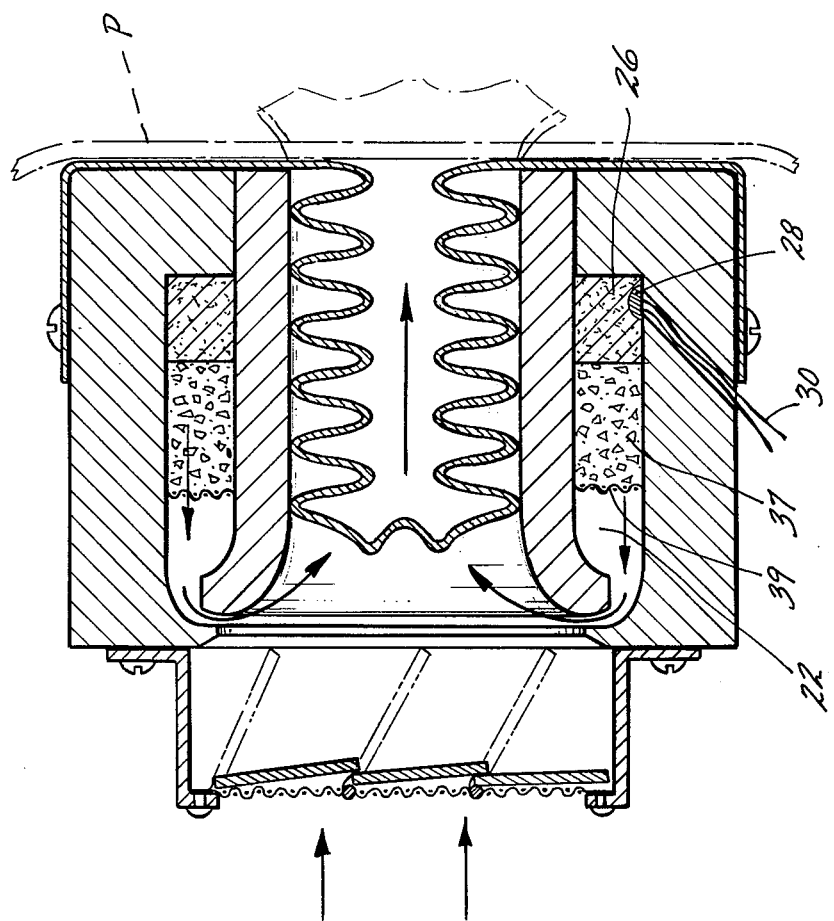
FIG. 3 is a sectional view similar to FIG. 2 but showing an alternative embodiment of the aspirator of this invention.

Referring to FIG. 3, an alternative embodiment of the aspirator of this invention is shown. The propellant charge 26 is posidoned within the chamber 22, as is the coolant material 37 and porous body 39. This embodiment results in an even, more compact arrangement of operating parts of the aspirator.

The aspirator assembly may be mounted anywhere in a vehicle where needed, and due to its compactness, may be readily positioned behind a knockout panel P (shown in phantom) which forms part of the normal interior of the vehicles. For example, the panel P could be part of the dashboard of the vehicle.

The aspirator-bag inflator operates as follows. When a collision is sensed, the squib 28 is ignited and the propellant 26 burned to produce a stream of pressurized gas, such as nitrogen, or the like, which flows through the plate 32 and conduit 36, filling the chamber 22. Pressurized gas is expelled from the chamber 22 through the slot 38 and flows in the direction of the arrows A and B, the latter depicting the direction of flow of primary gas induced by the airfoil shape of the plate surface 40, which illustrates the Coanda primary gas flow pattern. The high pressure flow of primary gas then encounters the folded air bag 14 and begins to expand the latter in the direction of the arrow C so that the bag 14 moves against the knockout panel P, which is relatively lightly held in place, and dislodges the panel P from its covering position. This initial movement of the bag 14 to dislodge the panel P is aided by back pressure of the primary gas which acts upon the flaps 46 and forces them to pivot tightly against each other to retard backward flow of the primary gas.

After the bag 14 has dislodged the panel P, the bag 14 begins to inflate to the right, as seen in FIG. 2, thus moving out of the aspirator throat 20. As the bag 14 leaves the aspirator throat, a drop in pressure occurs in the aspirator throat, which pressure drop is accentuated by the movement of primary gas over the airfoil surface 40 and toward the inflating bag. Thus a suction effect is created within the aspirator throat 20 which draws ambient air through the screen 44 and into the aspirator throat 20, in the direction indicated by arrows D. This entrainment and flow of ambient air causes the flaps 46 to pivot to the positions 46' (shown in phantom) which allows for a greater flow of ambient air through the aspirator throat 20 and into the expanding air bag 14. The Coanda-type flow of primary gas over the air foil surfaces 40 sustains and increases the entrainment and flow of ambient air through the aspirator throat 20 and into the air bag 14 until the latter is fully inflated, as shown at 14' (in phantom). Should a vehicle occupant strike the inflated air bag, there will be a sudden increase in pressure therein, with a resultant increase in back pressure within the aspirator throat which results in the flaps 46 being pivoted back to their sealing positions, thus preventing, temporarily, gas from exiting from the air bag through the aspirator throat, thereby sustaining the cushioning ability of the air bag.

It has been found that a Coanda aspirator of the design shown can inflate an average size air bag in 5-30 milliseconds using a primary gas pressure of only 12 psig.

It will be readily appreciated that the air bag inflation system of this invention will occupy less space in a vehicle since it uses the ambient air to inflate the bag, and since it permits the deflated air bag to be disposed in the throat of the aspirator. By using a Coanda-type aspirator, greater efficiency in aspirating ambient air into the air bag is achieved, and greater design freedom is attained. The size and shape of the Coanda aspirator of this invention can be tailored specifically for the desired placement in the vehicle and the amount of cushioning required.

Since many changes and variations of the disclosed embodiment of the invention may be made without departing from the inventive concept, it is not intended to limit the invention otherwise than as required by the appended claims.

What is claimed is:

1. An air bag inflation system for use in protecting vehicle passengers against injury in a collision, said system comprising:
   a. means providing a source of pressurized primary fluid;
   b. an ambient air aspirator including:
      i. means forming a tubular throat having an upstream end for the induction of ambient air, and a downstream end for the expulsion of a mixture of ambient air and said primary fluid under pressure, said throat having said upstream end thereof formed with an air foil-shaped surface;
      ii. means forming an annular chamber radially adjacent to said throat;
      iii. means forming a slot opening from said annular chamber into said throat with said air foil-shaped surface forming one side of said slot;
   c. means providing a fluid flow path between said source of primary fluid and said annular chamber; and
   d. an inflatable air bag mounted adjacent said downstream end of said throat to receive said mixture of primary fluid and ambient air under pressure for inflation of said air bag.

2. The system of claim 1, wherein said air bag is folded and disposed within said throat prior to being inflated.

3. An air bag inflation system for use in protecting vehicle passengers against injury in a collision, said system comprising:
   a. an ambient air aspirator including:
      i. means forming a tubular throat of a generally flattened cross-sectional configuration, said throat having an upstream end for the induction of ambient air, and a downstream end for the expulsion of a mixture of ambient air and primary fluid under pressure, said throat having said upstream end thereof formed with an air foil-shaped surface;
      ii. means forming an annular chamber radially adjacent to said throat;
      iii. means forming a slot opening from said annular chamber into said throat, with said air foil-shaped surface forming one side of said slot;
   b. combustible means for producing a supply of said pressurized primary fluid;
   c. means providing a fluid flow path between said combustion means and said annular chamber for passage of said pressurized primary fluid from said combustible means to said annular chamber; and
   d. an inflatable air bag mounted adjacent said downstream end of said throat to receive a mixture of said primary fluid and ambient air under pressure for inflation of said air bag.

4. The system of claim 3, wherein said air bag is folded and disposed within said throat prior to being inflated.

5. An air bag inflation system for use in protecting vehicle passengers against injury in a collision, said system comprising:
   a. an ambient air aspirator including:
      i. means forming a tubular throat having an upstream end for the induction of ambient air, and a downstream end of the expulsion of a mixture of ambient air and primary fluid under pressure, said throat having said upstream end thereof formed with an air foil-shaped surface;
      ii. means forming an annular chamber radially adjacent to said throat;
      iii. means forming a slot opening from said annular chamber into said throat with said air foil-shaped surface forming one side of said slot; and
   b. combustible means disposed in said annular chamber for producing a supply of said pressurized primary fluid in said annular chamber.

6. The system of claim 5, further comprising an air bag mounted on said downstream end of said throat, said air bag being folded and disposed within said throat prior to being inflated.

* * * * *